United States Patent Office 2,839,579
Patented June 17, 1958

2,839,579
PROCESS FOR THE PRODUCTION OF KETONES

Walter Kimel, Highland Park, and Norbert William Sax, Little Falls, N. J., assignors to Hoffmann-La Roche Inc., Nutley, N. J., a corporation of New Jersey No Drawing. Application June 27, 1956
Serial No. 594,121

10 Claims. (Cl. 260—595)

This invention relates to a process for the production of ketones. More particularly this invention relates to a process for the production of unsaturated aliphatic ketones by the catalytic pyrolysis of substituted propargyl acetoacetates.

In particular, the invention relates to the production of unsaturated ketones having two conjugated double bonds and corresponding to the formula

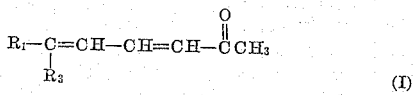

wherein $R_1$ represents lower alkyl or lower alkenyl and $R_2$ represents lower alkyl by pyrolyzing a substituted propargyl acetoacetate having the formula

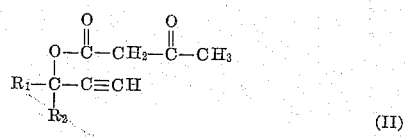

wherein $R_1$ and $R_2$ have the same significance defined above in the presence of an aluminum tri(lower alkoxide) and a lower fatty acid. Carbon dioxide is thereby eliminated in the reaction.

Lower alkyl groups represented by $R_1$ and $R_2$ and lower alkenyl groups represented by $R_1$ in the above formula are, respectively, straight chain and branched chain saturated and unsaturated aliphatic groups, for example, methyl, ethyl, propyl, isopropyl, butyl, isobutyl, allyl, 4-methyl-3-pentenyl, 3,4-dimethyl-3-pentenyl, and the like. A preferred class of aliphatic groups represented by $R_1$ and $R_2$ includes methyl, ethyl, isobutyl, 4-methyl-3-pentenyl, and 3,4-dimethyl-3-pentenyl. A preferred class of starting materials and products formed from them by the process of this invention includes those compounds wherein $R_1$ represents methyl, ethyl, isobutyl, 4-methyl-3-pentenyl, or 3,4-dimethyl-3-pentenyl and $R_2$ represents methyl in the above formulae.

The process of this invention is effected by adding catalytic amounts of an aluminum tri(lower alkoxide) and a lower fatty acid to a substituted propargyl acetoacetate corresponding to Formula II above and heating the mixture, preferably with efficient stirring, to a temperature sufficiently high to cause a steady evolution of carbon dioxide. The completion of the reaction is indicated by cessation of the evolution of carbon dioxide. The reaction mixture can be worked up and the products isolated by conventional procedures, e. g., simple fractionation, vacuum distillation, etc., depending upon the relative boiling points of the ketone product and of the contaminants present in the crude. When the boiling points of the components of the reaction mixture are close to each other, the contaminants can be removed by washing with mildly alkaline or mildly acidic reagents.

Aluminum tri(lower alkoxides) which are used as catalysts in conjunction with a lower fatty acid include, for example, aluminum tri(methoxide), aluminum tri(ethoxide), aluminum tri(isopropoxide), aluminum tri(n-butoxide), aluminum tri(n-pentoxide), aluminum tri(n-heptoxide), etc. It is preferred, however, to use an aluminum tri(lower alkoxide) wherein the alkoxide radical contains from 2 to 4 carbon atoms, e. g. aluminum tri(ethoxide), aluminum tri(isopropoxide), aluminum tri(n-butoxide), aluminum tri(t-butoxide) and the like. A particularly preferred aluminum tri(lower alkoxide) is aluminum tri(isopropoxide).

Lower fatty acids used in conjunction with the aluminum tri(lower alkoxide) as catalyst for the reaction include acetic acid, propionic acid, butyric acid, valeric acid, isovaleric acid, caproic acid, etc. Lower fatty acids having 2 to 3 carbon atoms, i. e. acetic acid and propionic acid, are preferred.

The combination catalyst utilized according to this invention effects better yields of recoverable product and also more consistent results. That is, the unsaturated ketones are produced in higher yields than obtained by prior methods and these high yields are obtained consistently.

The proportion of catalyst used in the process of this invention is based on the molar amount of substituted propargyl acetoacetate utilized as starting material. About 2 to about 12 grams of lower fatty acid and about 0.1 gram to about 1.5 grams of aluminum tri(lower alkoxide) per mol of substituted propargyl acetoacetate are advantageously used. Preferably about 3 grams of acid and about 0.2 gram of aluminum alkoxide per mol of ester are used.

The pyrolysis is preferably effected at a temperature in the range of about 150° to 190° C.

The pyrolysis of the propargyl acetoacetate may be effected in a solvent for the ester if desired, but it is not essential. Suitable solvents are those having a boiling point above the pyrolysis temperature and inert under the conditions of the reaction. Preferably the boiling point of the solvent is out of the range of the boiling points of the reaction products. Solvents which may be used include high boiling hydrocarbons or hydrocarbon fractions, e. g. decalin, tetralin, mineral oil, petroleum ether, high boiling inert ethers, e. g. diphenyl ether, etc.

The propargyl acetoacetates which are used as starting materials for the process of this invention are obtained by condensing, while agitating efficiently, diketene with a disubstituted propargyl alcohol bearing two hydrocarbon substituents on the 1-carbon atom of the propargyl radical.

The unsaturated ketones obtained by the present process are generically known, having use as odor imparting agents for perfumery compositions or as intermediates for such agents.

The invention is further illustrated by the following examples. All temperatures are in degrees centigrade (uncorrected).

Example 1

To a mixture of 1176 g. (7.0 mols) of 1,1-dimethyl-propargyl acetoacetate and 588 g. of light mineral oil were added 1.4 g. of aluminum tri(isopropoxide) and 21 g. of acetic acid. The mixture was stirred vigorously, and was heated in an oil bath to 160–180°, whereby a vigorous evolution of carbon dioxide resulted. When the evolution of gas had ceased (about 5½ hours), heating was discontinued, and the residual liquid was subjected to a vacuum fractional distillation. The chief product was obtained as a yellow liquid of B. P. 85–87° (11 mm.); $n_D^{25}=1.5308$, consisting essentially of a mixture of stereoisomers of 6-methyl-3,5-heptadien-2-one.

Example 2

A mixture of 236 g. (1.0 mol) of 1-methyl-1-(4-methyl-3-penten-1-yl)-propargyl acetoacetate, 250 cc. of decalin, 3 g. of propionic acid and 0.2 g. of aluminum tri(isopropoxide) was stirred vigorously in a 1-liter 3-neck flask. It was heated by a bath at 160–185° to maintain a steady evolution of carbon dioxide, which was terminated after two hours. Then, the reaction mixture was allowed to cool and was dissolved in 250 cc. of petroleum ether. The solution was extracted three times with 250 cc. portions of saturated aqueous sodium bicarbonate and was washed to neutrality with water. The organic portion was dried over sodium sulfate and, after removal of the solvent by distillation, the residue was distilled through an efficient fractionation column. The main product was obtained at 89–94° (0.5 mm.); $n_D^{25}=1.5280$, and consisted essentially of 6,10-dimethyl-3,5,9-undecatrien-2-one.

Example 3

A 2-liter 3-neck flask equipped with a mechanical stirrer, thermometer, dropping funnel and drying tube was charged with 304 g. (3.1 mols) of 3-methyl-1-pentyn-3-ol, 300 cc. of petroleum ether, 6 cc. of pyridine and 6 cc. of acetic acid. The solution was stirred at room temperature, and 285.8 g. (3.4 mols) of diketene were added, dropwise, during two hours. The reaction temperature was maintained at 25–30° by external cooling. Stirring was continued for an additional six hours at that temperature. Then, the mixture was washed successively with two 200 cc. portions of 15% aqueous sulfuric acid, four 200 cc. portions of saturated aqueous sodium bicarbonate, and finally with water until neutral. The organic layer was dried over calcium sulfate, and after removal of the solvent by distillation, the product was purified by vacuum distillation. The product, 3-methyl-1-pentyn-3-yl acetoacetate, was obtained as a colorless liquid; B. P. 57–60° (0.2 mm.); $n_D^{25}=1.4472$.

The ester obtained above, 3-methyl-1-pentyn-3-yl acetoacetate (550 g.), was placed in a 2-liter 3-neck flask along with 275 g. of mineral oil, 0.6 g. of aluminum tri(isopropoxide), and 9.0 g. of acetic acid. The mixture was stirred efficiently, and was heated to 160–175°, resulting in a rapid evolution of carbon dioxide. Heating was continued for 5 hours to complete the reaction. Then, the residual liquid was distilled through an efficient fractionation column. The chief product, 6-methyl-3,5-octadien-2-one, was obtained as a mixture of stereoisomers, B. P. 106–110° (19 mm.); $n_D^{25}=1.5255$.

Example 4

To a solution of 302.2 g. (2.395 mols) of 3,5-dimethyl-1-hexyn-3-ol in an equal volume of petroleum ether was added 5 cc. each of pyridine and acetic acid. The mixture was stirred vigorously, and 221.3 g. (2.63 mols) of diketene were added, dropwise, over a period of two hours. The reaction was exothermic, and was maintained at 25–30° by external cooling. After about five hours there was no further evidence of heat evolution. Then, the solution was washed twice with dilute aqueous sulfuric acid, several times with saturated aqueous sodium bicarbonate solution, and finally with water until neutral. The organic layer was dried with calcium sulfate, and the solvent was removed by vacuum distillation. The residue, 3,5-dimethyl-1-hexyn-3-yl acetoacetate, was obtained in quantitative yield, $n_D^{25}=$ E.4482, and was of sufficient purity for use in the next step.

The above ester, 3,5-dimethyl-1-hexyn-3-yl acetoacetate, was diluted with 253 g. of mineral oil, along with 7 g. of acetic acid and 0.5 g. of aluminum tri(isopropoxide). The mixture was stirred vigorously, and was heated to 155–170°, causing a rapid evolution of carbon dioxide. Heating was continued until no further gas was emitted (about three hours). Then, the residue was allowed to cool and was diluted with 300 cc. of petroleum ether. The solution was washed with 300 cc. of 15% aqueous sulfuric acid, three times with 300 cc. portions of saturated aqueous sodium bicarbonate, and finally with water until neutral. The product was dried over calcium sulfate, and finally purified by fractional distillation. 6,8-dimethyl-3,5-nonadien-2-one was obtained as a yellow liquid, B. P. 79–82° (1 mm.); $n_D^{25}=1.5153$.

We claim:

1. A process for the production of unsaturated ketones having the formula

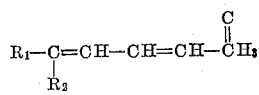

wherein $R_1$ represents a member of the group consisting of lower alkyl and lower alkenyl and $R_2$ represents lower alkyl which comprises catalytically pyrolyzing an ester having the formula

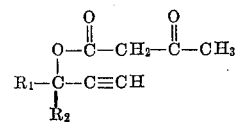

wherein $R_1$ and $R_2$ have the significance defined above, in the presence of aluminum tri(lower alkoxide) and a lower fatty acid.

2. A process as in claim 1 wherein the catalyst comprises aluminum tri(isopropoxide) and acetic acid.

3. A process as in claim 1 wherein the catalyst comprises aluminum tri(isopropoxide) and propionic acid.

4. A process for the production of unsaturated ketones having the formula

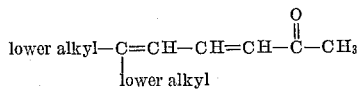

which comprises catalytically pyrolyzing an ester having the formula

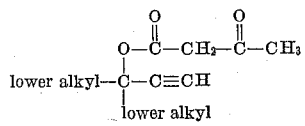

in the presence of aluminum tri(lower alkoxide) and a lower fatty acid.

5. A process as in claim 4 wherein the catalyst comprises aluminum tri(isopropoxide) and propionic acid.

6. A process as in claim 4 wherein the catalyst is used in a proportion of about 2 to about 12 grams of lower fatty acid and about 0.1 to about 1.5 grams of aluminum tri(lower alkoxide) per mol of ester.

7. A process for the production of unsaturated ketones having the formula

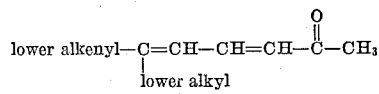

which comprises catalytically pyrolyzing an ester having the formula

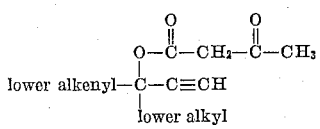

in the presence of aluminum tri(lower alkoxide) and a lower fatty acid.

8. A process as in claim 7 wherein the catalyst comprises aluminum tri(isopropoxide) and acetic acid.

9. A process as in claim 7 wherein the catalyst is used in a proportion of about 2 to about 12 grams of lower fatty acid and about 0.1 to about 1.5 grams of aluminum tri(lower alkoxide) per mol of ester.

10. A process which comprises heating 1-methyl-1-(4-methyl-3-penten-1-yl)-propargyl acetoacetate in the presence of aluminum tri(isopropoxide) and propionic acid thereby eliminating carbon dioxide from said acetoacetate.

References Cited in the file of this patent

UNITED STATES PATENTS 2,661,368  Kimel et al. _____ Dec. 1, 1953

FOREIGN PATENTS 1,079,129  France _____ May 19, 1954

UNITED STATES PATENT OFFICE
Certificate of Correction

Patent No. 2,839,579                                           June 17, 1958

Walter Kimel et al.

It is hereby certified that error appears in the printed specification of the above numbered patent requiring correction and that the said Letters Patent should read as corrected below.

Column 1, lines 23 to 26, the formula should appear as shown below instead of as in the patent—

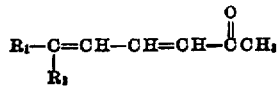

column 3, line 66, for "$n_D{}^{25}$=E.4482," read —$n_D{}^{25}$=1.4482,—; column 4, lines 11 to 14, claim 1, the formula should appear as shown below instead of as in the patent—

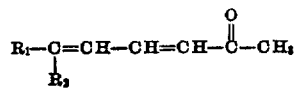

Signed and sealed this 26th day of August 1958.

[SEAL]

Attest:
KARL H. AXLINE,
*Attesting Officer.*

ROBERT C. WATSON,
*Commissioner of Patents.*